United States Patent [19]
Konz et al.

[11] 3,818,091
[45] June 18, 1974

[54] PHARMACEUTICAL COMPOSITIONS CONTAINING A LPHA-PHENY-ALPHA-PYRIDYL-ACETONITRILE AND METHOD OF USE

[75] Inventors: Wilhelm Konz, Ingelheim am Rhine; Franz Waldeck, Mainz-Hechtsheim, both of Germany

[73] Assignee: Boehringer Ingelheim GmbH, Ingelheim am Rhein, Germany

[22] Filed: Feb. 7, 1973

[21] Appl. No.: 330,183

[30] Foreign Application Priority Data
Feb. 12, 1972   Germany.......................... 2206785

[52] U.S. Cl. ............................................. 424/263
[51] Int. Cl............................................ A61k 27/00

[58] Field of Search.................................... 424/263

[56] References Cited
UNITED STATES PATENTS
3,225,054   12/1965   Cusic et al.......................... 260/295

OTHER PUBLICATIONS
Helv. Chim. Acta, 27, 1748–532, 1753–56, (1944).

*Primary Examiner*—Albert T. Meyers
*Assistant Examiner*—Frederick E. Waddell
*Attorney, Agent, or Firm*—Hammond & Littell

[57] ABSTRACT

Pharmaceutical compositions containing as an active ingredient α-phenyl-α-pyridyl-acetonitrile, and a method of inhibiting stomach juice secretion and combatting stomach ulcers therewith.

1 Claim, No Drawings

PHARMACEUTICAL COMPOSITIONS CONTAINING A LPHA-PHENY-ALPHA-PYRIDYL-ACETONITRILE AND METHOD OF USE

This invention relates to novel pharmaceutical compositions containing α-phenyl-α-pyridyl-acetonitrile as an active ingredient, and to a novel method of inhibiting stomach juice secretion and combatting stomach ulcers therewith in warm-blooded animals.

BACKGROUND OF THE INVENTION

Gastrointestinal diseases, and particularly ulcerations of the stomach, have heretofore been therapeutically treated mainly with medications based on anti-cholinergics, that is, compounds of varying chemical structure which exert atropine-like effects upon the parasympathetic nervous system, principally suppression of spasms of the smooth musculature and reduction of gastrointestinal secretions. However, in addition to these desired pharmacological effects, such anticholinergics also produce undesirable side effects usually associated with anticholinergics, such as mydriasis, dryness of the mouth and especially undesirable effects upon the heart and circulatory system.

OBJECT OF THE INVENTION

It is an object of the present invention to provide pharmaceutical compositions for the treatment of gastrointestinal diseases and especially ulcerations of the stomach, which contain as an active ingredient a stomach juice secretion inhibiting and anti-ulcerogenic agent which is not of the anticholinergic type.

Another object of the present invention is to provide a method for effectively inhibiting gastric juice secretion and combatting ulceration of the stomach without concurrently producing the undesirable side effects of anti-cholinergics, such as mydriasis, dryness of the mouth and adverse effects upon the heart and circulatory system.

Other objects and advantages of the instant invention will become apparent as the description thereof proceeds.

THE INVENTION

The above objects are achieved in accordance with the present invention by using α-phenyl-α-pyridyl-acetonitrile as the stomach juice secretion inhibiting and anti-ulcerogenic agent for the treatment of hypersecretion and ulceration of the stomach in warm-blooded animals, such as rats and dogs.

α-Phenyl-α-pyridyl-acetonitrile is a known compound whose preparation is described in Helv. Chim. Acta 27, 1748 et seq. (1944); however, the literature does not disclose any pharmacological properties or any commercial utility for this compound.

Compared to α-phenyl-α-pyridyl-thioacetamide, a related known compound whose pharmacological properties are described in the literature, α-phenyl-α-pyridyl-aceto-nitrile is significantly less toxic and exhibits a substantially greater therapeutic ratio.

Moreover, α-phenyl-α-pyridyl-acetonitrile does not produce the undesirable side effects associated with anticholinergics, such as mydriasis, suppression of salivation and especially adverse effects upon the heart and circulatory system.

The advantageous pharmacological properties of α-phenyl-α-pyridyl-acetonitrile in comparison to α-phenyl-α-pyridyl-thioacetamide are demonstrated by the following comparative tests:

1. Inhibition of stomach juice secretion:

The median effective stomach acid secretion inhibiting dose ($ED_{50}$), i.e., the peroral dose in mgm/kg which reduces the amount of total secreted stomach acid by 50 percent over a given period of time, was determined for (A) α-phenyl-α-pyridyl-acetonitrile and (B) α-phenyl-α-pyridyl-thioacetamide in a statistically significant number of Shay-rats whose gastric juice secretion had been stimulated by subcutaneous injection of various substances. In addition, the median peroral lethal dose ($LD_{50}$) was determined on laboratory rats by conventional methods.

The following results were obtained:

| Compound | $ED_{50}$ p.o. mgm/kg Histamine diphosphate 10 mgm base/kg | Stimulation with Carbachol 0.1 mgm/kg | Tetragastrin 0.1 mgm/kg | $LD_{50}$ p.o. mgm/kg rat |
|---|---|---|---|---|
| A | 25 | 30 | 15 | 570 |
| B | 40 | 40 | 30 | 320 |

These values show that, by virtue of its lower median effective dose and its considerably higher median lethal dose, α-phenyl-α-pyridyl-acetonitrile has a significantly greater therapeutic ratio than the comparative compound.

2. Anti-ulcerogenic activity:

α-Phenyl-α-pyridyl-acetonitrile also exhibited very effective anti-ulcerogenic activity against a variety of artificially induced ulcerations, such as those induced with glucose, reserpine or insulin, and against the ulcer induced according to Shay.

3. Side effects: α-Phenyl-α-pyridyl-acetonitrile produces practically no undesirable side effects. In rats and dogs it altered neither the cardiac frequency nor the blood pressure; nor did it exhibit any antihistaminic and anticholinergic activity, and no central sedative effects could be discerned.

For pharmaceutical purposes α-phenyl-α-pyridyl-acetonitrile is administered to warm-blooded animals perorally or parenterally as an active ingredient in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. The daily oral dose rate of α-phenyl-α-pyridyl-acetonitrile is from 0.33 to 6.67 mgm/kg body weight, preferably from 0.66 to 3.34 mgm/kg body weight, evenly divided over two to three single doses. For parenteral adminstration the single effective dose is from 0.016 to 0.84 mgm/kg.

Such pharmaceutical compositions may, in addition, also contain an effective dosage unit of one or more other pharmacologically active ingredients, such as hypnotics, tranquilizers, spasmolytics or anesthetics.

The following examples illustrate a few pharmaceutical dosage unit compositions comprising α-phenyl-α-pyridyl-acetonitrile as an active ingredient and represent the best modes contemplated of putting the invention into practical use. The parts are parts by weight unless otherwise specified.

EXAMPLE 1

Coated Pills

The pill core composition is compounded from the following ingredients:

| | | |
|---|---:|---|
| α-Phenyl-α-pyridyl-acetonitrile | 50 | parts |
| Corn starch | 90 | do. |
| Lactose | 50 | do. |
| Magnesium stearate | 4 | do. |
| Gelatin | 6 | do. |
| Total | 200 | parts |

Preparation:

The acetonitrile derivative is admixed with the corn starch and the lactose, the mixture is granulated with the aid of an aqueous 10 percent solution of the gelatin through a 1 mm-mesh screen, the granulate is dried at 40°C. and again passed through the screen, the dry granulate is admixed with the magnesium stearate, and the resulting composition is compressed into 200 mgm-pill cores. The pill cores are subsequently coated with a thin shell consisting essentially of a mixture of sugar, talcum, titanium dioxide and gum arabic and finally polished with beeswax. Each coated pill contains 50 mgm of α-phenyl-α-pyridyl-acetonitrile and is an oral dosage unit composition with effective stomach juice secretion inhibiting and anti-ulcerogenic action.

EXAMPLE 2

Tablets

The tablet composition is compounded from the following ingredients:

| | | |
|---|---:|---|
| α-Phenyl-α-pyridyl-acetonitrile | 60 | parts |
| Corn starch | 125 | do. |
| Lactose | 100 | do. |
| Soluble starch | 10 | do. |
| Magnesium stearate | 5 | do. |
| Total | 300 | parts |

Preparation:

The acetonitrile derivative is intimately admixed with the lactose and the corn starch, the mixture is granulated through a fine-mesh screen with the aid of an aqueous solution of the soluble starch, the granulate is dried and admixed with the magnesium stearate, and the resulting composition is compressed into 300 mgm-tablets in a conventional tablet making machine. Each tablet contains 60 mgm of α-phenyl-α-pyridyl-acetoniltrile and is an oral dosage unit composition with effective stomach juice secretion inhibiting and anti-ulcerogenic action.

EXAMPLE 3

Tablets with combination of active ingredients

The tablet composition is compounded from the following ingredients:

| | | |
|---|---:|---|
| α-Phenyl-α-pyridyl-acetonitrile | 75 | parts |
| 2-Methoxy-4-amino-5-chloro-benzoic acid N-(β-N'-diethyl-amino-ethyl)-amide monohydrochloride | 10 | do. |
| Corn starch | 120 | do. |
| Lactose | 80 | do. |
| Soluble starch | 10 | do. |
| Magnesium stearate | 5 | do. |
| Total | 300 | parts |

Preparation:

The ingredients are admixed and compounded in a manner analogous to that described in the preceding example, and the composition is compressed into 300 mgm-tablets. Each tablet contains 75 mgm of α-phenyl-α-pyridyl-aceto-nitrile and 10 mgm of the benzamide compound and is an oral dosage unit composition with effective stomach juice secretion inhibiting, anti-ulcerogenic and tranquilizing action.

EXAMPLE 4

Suppositories

The suppository composition is compounded from the following ingredients:

| | | |
|---|---:|---|
| α-Phenyl-α-pyridyl-acetonitrile | 100 | parts |
| Suppository base (e.g. cocoa butter) | 1600 | do. |
| Total | 1700 | parts |

Preparation:

The finely powdered acetonitrile derivative is stirred with the aid of an immersion homogenizer into the suppository base which has previously been melted and cooled to about 40°C. 1,700 mgm-portions of the resulting mixture are poured at 40°C. into cooled suppository molds and allowed to harden therein. Each suppository contains 100 mgm of α-phenyl-α-pyridyl-acetonitrile and is a rectal dosage unit composition with effective stomach juice secretion inhibiting and anti-ulcerogenic action.

The amount of α-phenyl-α-pyridyl-acetonitrile in the above illustrative examples may be varied to achieve the dosage ranges set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A method of treating gastric hypersecretion and ulcerations of the stomach in a warm-blooded animal, which comprises orally, parenterally or rectally administering to said animal an effective gastric secretion inhibiting and anti-ulcerogenic amount of α-phenyl-α-pyridyl-acetonitrile.

* * * * *